(12) United States Patent
Garrett et al.

(10) Patent No.: US 10,527,204 B2
(45) Date of Patent: Jan. 7, 2020

(54) MOLDED HOSE WITH FABRIC LAYER

(71) Applicant: Purosil LLC, Corona, CA (US)

(72) Inventors: Thomas M Garrett, Corona, CA (US); Richard W. Posiviata, Corona, CA (US)

(73) Assignee: Purosil LLC, Corona, CA (US)

( * ) Notice: Subject to any disclaimer, the term of this patent is extended or adjusted under 35 U.S.C. 154(b) by 490 days.

(21) Appl. No.: 14/452,953

(22) Filed: Aug. 6, 2014

(65) Prior Publication Data

US 2016/0040806 A1 Feb. 11, 2016

(51) Int. Cl.
| | |
|---|---|
| *F16L 11/10* | (2006.01) |
| *F16L 11/00* | (2006.01) |
| *B29C 70/76* | (2006.01) |
| *B29L 23/00* | (2006.01) |

(52) U.S. Cl.
CPC ............ *F16L 11/10* (2013.01); *B29C 70/766* (2013.01); *F16L 11/005* (2013.01); *B29L 2023/005* (2013.01)

(58) Field of Classification Search
CPC ............................... F16L 11/10; B29C 70/766
USPC .......................................................... 138/125
See application file for complete search history.

(56) References Cited

U.S. PATENT DOCUMENTS

| | | | | |
|---|---|---|---|---|
| 3,043,612 A | * | 7/1962 | Songer ................... | F16L 11/112 138/109 |
| 3,378,282 A | * | 4/1968 | Demler, Sr. ............ | F16L 13/141 138/89 |
| 3,464,721 A | * | 9/1969 | Surko, Jr. .............. | F16L 21/005 285/148.17 |
| 3,502,356 A | * | 3/1970 | Schmunk ............... | F16L 21/022 138/109 |
| 3,857,415 A | * | 12/1974 | Morin .................... | F16L 11/115 138/122 |
| 4,023,835 A | * | 5/1977 | Ewing ...................... | E03F 3/04 138/130 |
| 4,172,607 A | * | 10/1979 | Norton ................... | F16L 21/005 285/236 |
| 4,763,695 A | * | 8/1988 | Dooley ................. | F16L 21/005 138/109 |
| 5,305,799 A | * | 4/1994 | Dal Palu ................. | F16L 11/11 138/109 |
| 5,611,374 A | * | 3/1997 | Blin ....................... | F16L 59/022 138/121 |
| 8,327,887 B2 | * | 12/2012 | Lockhart ................. | B29C 47/28 138/125 |

(Continued)

FOREIGN PATENT DOCUMENTS

| | | |
|---|---|---|
| CH | 202992430 | 6/2013 |
| JP | H109453 | 1/1998 |

*Primary Examiner* — Vishal Pancholi
(74) *Attorney, Agent, or Firm* — Erickson Kernell IP, LLC; John C. McMahon

(57) ABSTRACT

A reinforced hose includes an inner layer, a reinforcing intermediate layer, and an outer layer. The inner layer has and inwardly projecting sealing rib extending circumferentially on an inner surface thereof. The inner surface may also have an end stop to be engaged by a fitting received in the hose. The outer layer has a pair of annular clamp guides projecting outwardly which are axially spaced from an end of the hose. The sealing rib is positioned between the clamp guides to indicate an optimum location for a hose clamp.

21 Claims, 4 Drawing Sheets

(56) References Cited

U.S. PATENT DOCUMENTS

2003/0159744 A1\* 8/2003 Sakazaki ................ F16L 33/01
                                                                                                  138/109

\* cited by examiner

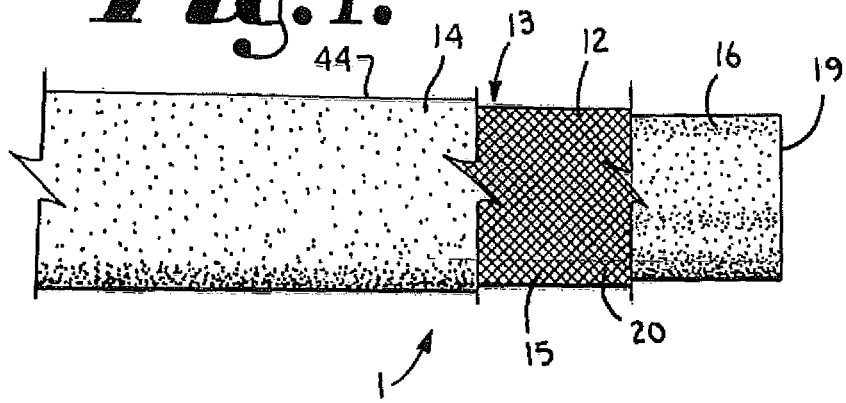
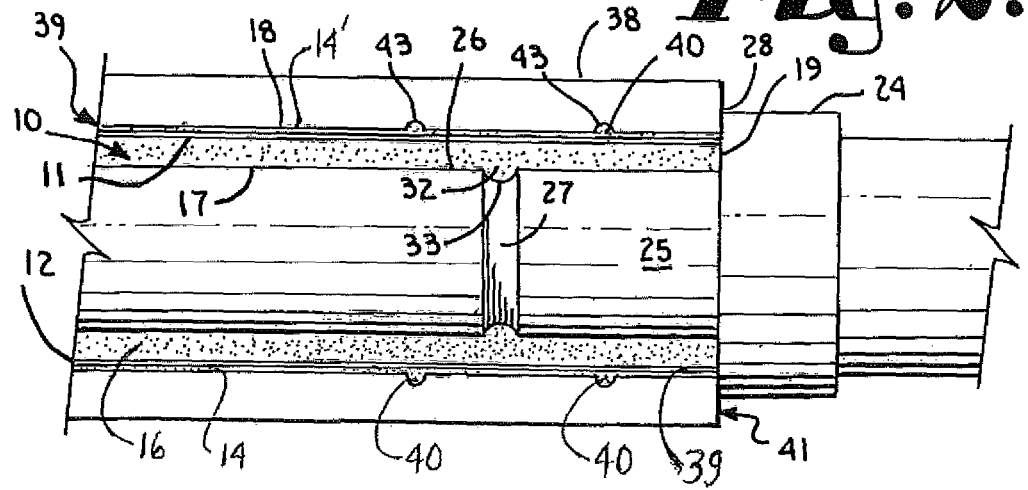
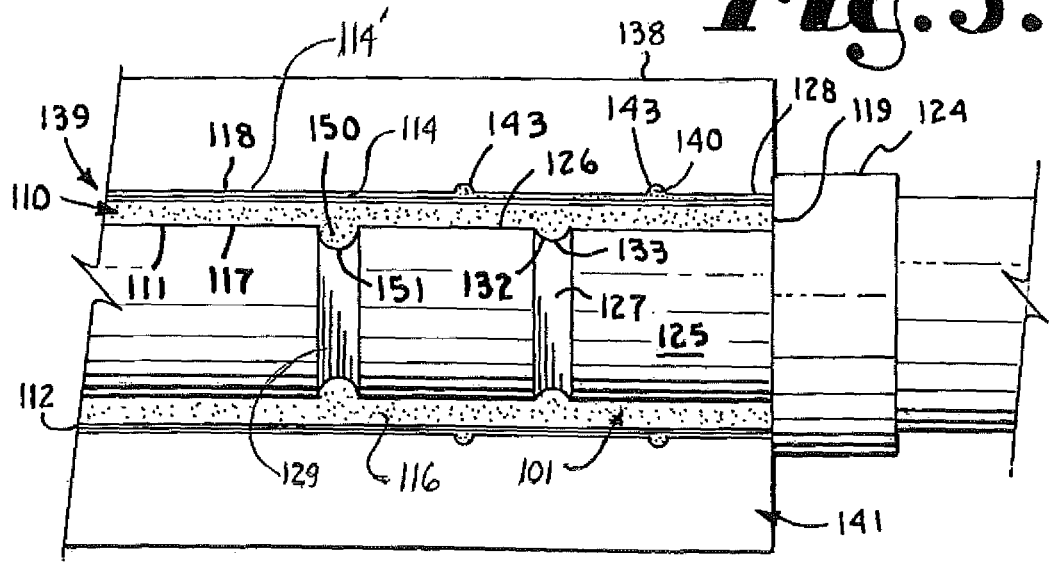

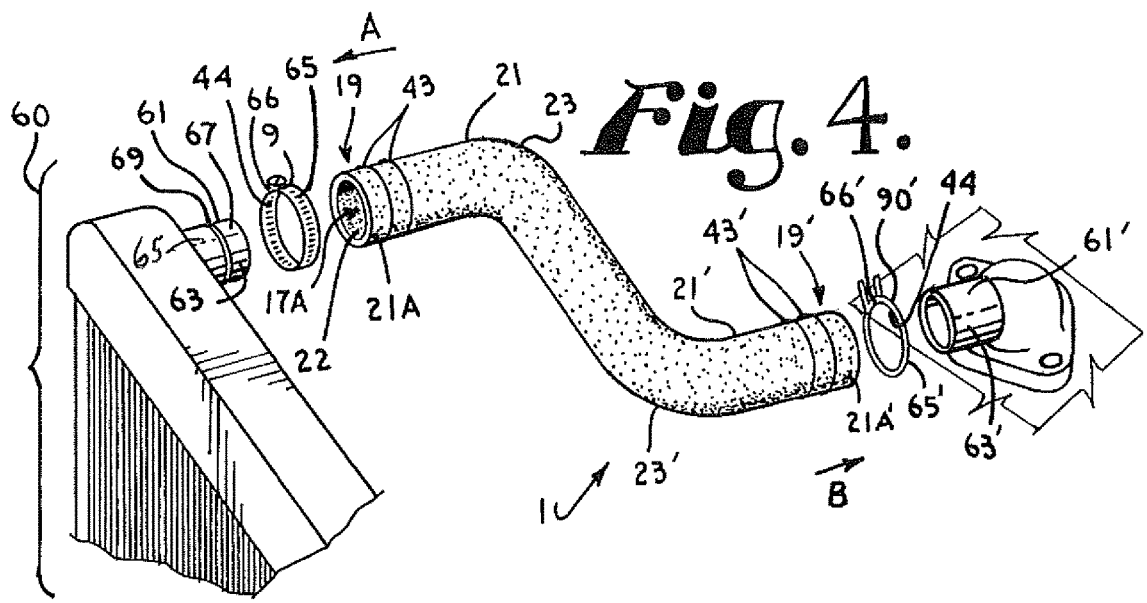

MOLDED HOSE WITH FABRIC LAYER

BACKGROUND OF THE INVENTION

The present invention relates to hoses and hose apparatus and to methods for manufacturing such hoses. More particularly, the present invention relates to types of hoses which are used with clamps for sealing connections to fittings.

A hose is a flexible tubular structure for conveying a fluid from one location to another. Some hoses are used in portable situations, such as garden hoses and fire hoses which carry water from sources to nozzles or other distribution devices, such as a sprinklers. Such hoses usually have conveniently removable connectors, such as threaded connectors. Other types of hoses are used in more fixed situations, such as where fittings to be connected by the hose are not aligned or where there is some movement between the interconnected fittings. Such hoses are often connected to the fittings by less conveniently removable means, such as circumferential clamps. Hoses intended for carrying fluids at high pressures are usually reinforced, as by one or more layers of a reinforcing fabric or other material. Hoses intended for use where they are subject to abrasive contact are provided with toughened external layers.

In a situation in which a hose is not under significant pressure or axial stresses, a hose may be retained on a fitting by frictional contact alone and adequately seal the carried fluid therein. If the hose is to be subjected to relatively high pressures and/or axial stresses, a retainer mechanism is usually employed to retain the hose on the fitting and to maintain a fluid seal between the hose and the fitting, such as a circumferential clamp. Conventional hoses do not provide structure to limit how far the hose should be sleeved onto a fitting or to suggest the most effective location to place a circumferential clamp.

In automotive applications, a coolant or water pump is employed to cycle an engine block coolant liquid through finned passages of a heat exchanger referred to as a "radiator" to transfer engine generated heat from the coolant to air flowing across the passages to thereby stabilize the temperature of the engine block. The radiator is typically rigidly mounted on a support frame, such as the vehicle chassis, while the engine, with block and water pump, is connected to the frame by somewhat resilient motor mounts to accommodate engine vibrations and engine movements in reaction to engine speed changes. Radiator hoses are typically used to connect the radiator to the engine block and water pump.

Friction between an inner surface of a hose and an outer surface of a fitting can cause difficulties when a hose is sleeved onto the fitting. Thus, the diameters of the inner hose surface and outer fitting surface must be related in such a manner that excessive labor is not required to install the hose on the fitting and that leakage between the surfaces is not promoted.

Hoses may be formed of a variety of rubbers, polymers, and composites depending of their intended use and environment. Hoses may be formed in discrete lengths or continuously by molding processes, extrusion processes, or the like. Hoses may be formed to shape in a "raw" condition and subsequently processed or treated to cure or vulcanize the material for strengthening and incorporating desired characteristics. Reinforcing layers for hoses can be in the form of woven, braided, or wrapping of fibers or threads. Reinforcing layers can be applied in discrete lengths or continuously woven about a hose layer formed by a continuous process.

SUMMARY OF THE INVENTION

The present invention is directed to a hose structure including an elongated tubular hose member having an outer surface, an inner surface, and a tubular axis, the hose member having opposite ends and a radially outwardly projecting circumferential clamp guide formed on the outer surface of the hose member in axially spaced relation to an end of the hose member. An embodiment of the hose structure may have a pair of axially spaced clamp guides. The hose structure may have an inwardly projecting circumferential sealing rib formed on the inner surface of the hose guide member in axially spaced to the clamp guide or between a pair of clamp guides to improve sealing with a fitting when a circumferential clamp is positioned on the structure adjacent the clamp guide. The hose structure may also have an inwardly projecting stop structure on the inner surface in axially spaced relation to the clamp guide to limit penetration of a fitting into the hose structure.

An embodiment of a hose according to the present invention includes an elastomeric inner layer with an inner surface; an intermediate woven fabric layer; an elastomeric outer layer with an outer surface, and including a radially outward and circumferentially extending molded clamp guide on the outer layer. The inner layer may be formed by extrusion. The outer layer is then molded onto the inner layer along with the clamp guide. In another embodiment the hose may include a second clamp guide. In an embodiment the hose may further include the inwardly projecting, circumferentially sealing rib which is molded on the inner layer inner surface in spaced relation to the clamp guide or guides, such as between the pair of parallel clamp guides. In another embodiment, the hose further includes the inwardly projecting stop structure, the stop structure extending circumferentially about the inner surface and having a diameter that is smaller than both the rib diameter and the inner surface diameter so an end of a fitting on which the hose is sleeved abuts the stop structure when an optimum length of the hose is slid onto the fitting.

A method of forming a hose structure according to the present invention comprises the steps of: forming an elongated tubular hose member having an outer surface, an inner surface, a tubular axis, and a substantially constant inner diameter, the hose member having opposite ends; and molding an outer layer onto the outer surface of the hose member, the outer layer including an outwardly projecting circumferential clamp guide, or pair of clamp guides, positioned in axially spaced relation to an end of the hose member. An intermediate layer, such as a reinforcing layer, may be formed on the inner layer prior to molding the outer layer. The outer layer may be molded using a mold having a cylindrical inner surface with circumferential clamp guide grooves which forms the clamp guides. The hose structure can be supported internally during molding of the outer layer by an elongated mandrel having a substantially constant diameter. The mandrel can be provided with one or more circumferential grooves to form one or more inwardly projecting circumferential sealing ribs on the inner surface of the hose structure. The mandrel can be provided with an additional circumferential groove to form an inwardly projecting circumferential stop member on the inner surface of the hose member in axially spaced relation to the clamp guide.

The present invention includes a method of forming a hose structure comprising the steps of: forming an elongated tubular hose member having an outer surface, an inner surface, a tubular axis, and a substantially constant inner diameter, the hose member having opposite ends; and molding an outer layer onto the outer surface of the hose member, the outer layer including an outwardly projecting circumferential clamp guide positioned in axially spaced relation to an end of the hose member. The clamp guide can be formed using a mold having a cylindrical inner surface with circumferential clamp guide groove which forms the clamp guide or a pair of axially spaced which forms a pair of clamp guides.

An embodiment of the method may include the steps of providing an elongated mandrel having a substantially constant diameter; and inserting the mandrel into the hose member to support the hose member during molding of the outer layer. The mandrel may have a circumferential groove to support the hose member during molding of the outer layer and to form an inwardly projecting circumferential rib on the inner surface of the hose member in axially spaced relation to the clamp guide. The mandrel may also have another circumferential groove to form an inwardly projecting circumferential stop member on the inner surface of the hose member in axially spaced relation to the clamp guide. The method may include step of providing a reinforcing layer on said hose member prior to molding the outer layer thereon.

Alternative methods of forming hose structures of the present invention include the steps of forming a multilayer hose body having a substantially constant tubular inner diameter by forming an inner layer, forming an intermediate layer in surrounding relation to the inner layer, and forming an outer layer on the intermediate layer, the hose body being untreated and formable; preparing a mandrel and fitting a portion of the hose body on the mandrel; deforming a portion of the hose body corresponding to the molding portion of the mandrel into a shape following a contour of the mandrel to obtain a tubular hose body; an outer mold including a groove, wherein the outer mold is compressed radially onto the hose body fitted on the mandrel so as to sandwich the hose body between the outer mold and the mandrel, such that the tubular hose body is deformed into groove of the mold and the molding portion of the mandrel, creating a clamp guide; and treating the tubular hose body to obtain the final form of the hose. Another method embodiment further includes the steps of: providing a molding portion of the mandrel with an annular groove, the groove being of an outer diameter smaller than the inner diameter of the tubular hose body of the straight interior wall; deforming a portion of the hose body corresponding to the molding portion into a shape following a contour of the groove to obtain a tubular hose body including an inwardly projecting circumferential sealing rib. In another method embodiment wherein the mandrel is hollowed out and provided with suction channels extending radially through the molding portion for communication between a hollow portion of the mandrel and an inside of the hose body fitted on the mandrel, applying a negative pressure to the hose body through the hollow portion and the suction channels so as to suction the hose body onto the mandrel to deform the hose body. Once the inner layer and outer layer are formed, the hose may be further treated by either vulcanizing or heating the hose body to cure and solidify the hose into its final shape.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary side elevational view of a reinforced hose with layers broken away according to the present invention.

FIG. 2 is a fragmentary sectional view showing assembly of the hose with a mandrel having a sealing rib groove to form an inwardly projecting circumferential sealing rib on an inner surface of the hose and an outer mold with a pair of clamp guide grooves to form clamp guides on an outer surface of the hose.

FIG. 3 is a view similar to FIG. 2 and showing a mandrel with a stop groove to form an inwardly projecting circumferential stop member, along the sealing rib groove and the pair of clamp guide grooves.

FIG. 4 is an exploded perspective view of a hose connection assembly including a hose according to the present invention extending between an automotive radiator and an engine block with two sets of clamps to seal the hose on fittings of the radiator and engine block.

FIG. 7a is a fragmentary sectional view of a hose connection assembly including a hose connected with a fitting having a sealing groove to receive a sealing rib on an inner surface of the hose.

FIG. 7b is a fragmentary sectional view of a hose connection assembly including a hose with a circumferential sealing rib and a circumferential stop ring.

FIG. 8a is a fragmentary perspective view illustrating a worm drive clamp which may be employed in sealing one end of the hose in accordance with the present invention.

FIG. 8b is a view similar to FIG. 8a and illustrating spring clamp which may be employed in sealing one end of the hose in accordance with the present invention.

FIG. 8c is a view similar to FIG. 8a and illustrating an ear clamp which may be employed in sealing one end of the hose in accordance with the present invention.

DETAILED DESCRIPTION OF THE INVENTION

Figure 5:
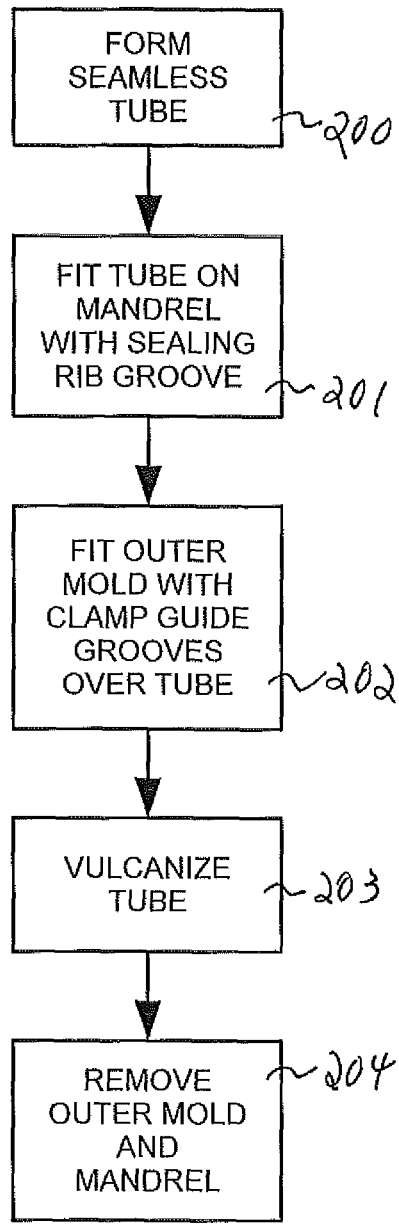
FIG. 5 is a flow diagram showing steps of a method of the present invention for producing a hose with clamp guides.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates a reinforced hose with a clamp guide according to the present invention. Referring now to FIGS. 1, 2, 6-9, the hose 1 generally comprises a reinforcement intermediate layer 12, an outer cover layer 14, and an inner layer 16. In forming the hose 1 of the present invention, the individual layers may be applied to form a hose 1 having a diameter substantially equal to the normal inside diameter of a clamp 9, 9', or 9". The inner layer 16 may be formed by extrusion of an elastomeric material in a tubular construction, and may include suitable additives along with a lubricant or a friction liner coating applied to the inner surface to enable ease of handling during forming operations. The details of these component layers 12, 14, and 16 are further discussed below along with their method of assembly generally in the order of assembly.

Referring to FIGS. 1 and 2, the illustrated hose 1 has a multilayered construction comprising a fabric or woven textile intermediate layer 12, an outer rubber layer 14 on an outer surface 13 of the intermediate layer 12, and an inner layer 16 with an inner surface 17 on an inner surface 11 of the intermediate layer 12. In one embodiment, the intermediate layer 12 can be laid into the inner layer 16, and an extrusion process forces the inner rubber layer 16 into intimate contact with the intermediate woven or braided reinforcement layer 12. That is, the inner layer 16 will be forced into interstices 15 of the reinforcement layer for contact with the intermediate layer 12 and/or into contact with portions of the intermediate layer that may extend into and/or through the reinforcement as a result of a braiding process. The result is the creation of an integral bond between the intermediate and inner layers 12 and 16 upon subsequent curing of the two layers. In addition, the reinforcement layer 12 will be embedded in and thereby mechanically locked between the resultant integrally joined intermediate and inner layers 12 and 16. In this embodiment, the outer layer 14 may be joined with an outer surface 18 of the inner layer 16 as the intermediate layer 12 is absorbed into the inner layer 16.

In the illustrated embodiment, the inner layer 16 along with the intermediate layer 12, constituting a middle layer, and the outer layer 14, extend through an entire length of the hose, from one end 19 to an opposite end 19' in an axial direction A (FIG. 4) of the hose 10. The intermediate layer 16 may be a seamless woven textile fiber jacket, with threads 20 thereof forming the fiber jacket.

The inner rubber layer 16, the intermediate layer 12, and the outer rubber layer 14 are made of or constructed of various materials or combinations thereof. More specifically, the inner layer 16 and outer layer 14 may be formed of materials such as NBR or nitrile butadiene rubber (acrylonitrile content being equal to or greater than 30% by mass), NBR with PVC (polyvinyl chloride), a class of fluorelastomers known as FKM, such as Viton (DuPont trademark), hydrogenated acrylonitrile butadiene rubber (H-NBR), ethylene propylene diene monomer (EPDM), and other types of materials and combinations thereof. Typical materials may also include various nylons, polyvinyl chlorides, polyethylene, polypropylene, or fluoroplastics. The primary criteria for selecting the material of the inner layer or core 16 is high resistance to permeation of the fluid of interest. The primary purpose of the outer layer 14 is to produce a cover, an insulator, or to keep the intermediate layer from vibrating out of the inner layer. Wall thicknesses of the inner layer 16 and the outer layer 14 are appropriate for the application and environment in which the hose is intended to be used.

For the intermediate layer 12 as a middle fabric layer, materials such as textile wire, synthetic textile fiber, spiral wrapped fabric, or woven textile jackets are preferably used. The intermediate layer may be spun, knitted, stockinette knitting, or circularly woven and may be interleaved into the inner layer 16. The immediate layer 12 is a reinforcing layer which increases the ability of the hose 1 to contain liquids and/or gases under pressure. The type of material used depends on the levels of pressure and temperature of the liquids with which the hose 1 is intended to be used.

Referring to FIG. 2, reference numeral 24 indicates a mandrel made of a rigid material, usually metal. The mandrel 24 has a molding portion 25 with an outer surface 26 of a shape corresponding to a contour of an inner surface 17 of the hose 1, such as a cylindrical shape with a substantially constant diameter. As shown in the FIG. 2, the mandrel 24 has a annular contour or groove 27 that goes about the circumference of the mandrel.

In a production method using the elements illustrated in FIG. 2, first, the middle fabric layer 12, the outer rubber layer 14, and the inner rubber layer 16, are successively laminated on one another, as by extrusion, to obtain an elongated straight tubular body portion 10. The tubular body 10 is cut to a desired length and, thereby, a tubular hose body 10 with a straight wall is formed 21 that is elastically deformable and unvulcanized.

An end 19 of the tubular hose body 10, as formed in this manner, is fitted on the mandrel 24 and is deformed into a shape following a contour of the outer surface 26 of mandrel 24. Simultaneously, a portion of the tubular hose body 10 corresponding to the groove 27 of the mandrel 24 is deformed into a shape following the groove 27, thereby forming an annular sealing rib 32, without deforming the outer layer 14. An annular rib tip 33 has an inner diameter less than the diameter of the inner surface 17 of the inner layer 16. In this embodiment, the tubular hose body 10 can be fitted onto the mandrel 24 relatively smoothly without encountering significant resistance from a molding portion 25 of the mandrel 24, since an outer diameter 28 of molding portion 25 of the mandrel 24 does not exceed an inner diameter of the inner layer 16 of a straight-walled portion 21 of the hose body 10. One of the purposes of the mandrel 24 is to prevent sag of the materials of all three layers 12, 14, and 16 of the hose body 10. It should be understood that the mandrel 24 may be implemented in multiple sections to serve the purpose of creating at least one sealing rib 32 and preventing sag.

Reference numeral 38 indicates an outer mold that includes an annular groove or recess 40 to be placed on the outer layer 14 of the tubular hose body 10. An inner cylindrical surface 39 of an end 41 of the outer mold 38 terminates adjacent the outer layer 14 of the hose body 10. The purpose of the annular recess 40 is to deform the hose 10 and create at least one clamp guide 43 on an outer surface 14' of the outer layer 14 in spaced relation to the end 19 of the hose body 10 for the purpose of facilitating the location of a clamp 9 for sealing off the interior 22 of the tubular hose body 10. The illustrated hose body 10 has a pair of axially spaced clamp guides 43. The recess 40 is formed so that the material of the uncured tube 10 can flow into the recess 40 of the outer mold 28 without deforming the straight walled portion 21 or the inner layer 16 of the hose 10.

As shown in FIG. 2, the outer mold 28 is pressed radially inwardly onto the tubular hose body 10 that is fitted on the molding portion 25 of the mandrel 24. A portion 21 of the tubular hose body 10 is sandwiched by and between the mandrel 24 and the outer mold 28. The portion 21 of the tubular hose body 10 is deformed into a shape following the groove 27 of the mandrel and the recess 40 of the outer mold 28 to form at least one clamp guide 43 and a sealing rib 32 in the tubular hose body 10.

The tubular hose body 10 positioned on the mandrel 24 and surrounded by the outer mold 28 is vulcanized by heating the mandrel 24 and mold 28 for a predetermined time to form the hose 1. Afterwards, the outer mold 28 is opened and removed from the hose 1 and the mandrel 24 is slid out of and removed from the hose 1. The result is a hose 1 of multilayer construction including the intermediate fabric layer 12, and the inner layer 16 with an annular sealing rib 32, and the outer layer 14 with the clamp guide 43. It should be noted at the opposed end 19' (FIG. 4) of the hose body 10, this process can be repeated.

In another embodiment, the mandrel may include inlet and outlet ports or bores (not shown) to supply steam or fluid pressure. Steam can be introduced into the mandrel 24 through a supply line to cause the hose 1 to expand and cure the material or fluid pressure to allow for easy removal. At the completion of the steam curing process, the mold 38 and mandrel 24 are removed or dismantled to release the hose 1.

According to the present embodiment, it is possible to produce a hose 1 with a curved portion 23 and/or 23' by use of a curved mandrel (not shown), as the molding portion 25 of the mandrel 24 does not affect the curved portion 23 of the hose 1. It should be understood that the hose 1 may remain in the outer mold 38 only long enough to take the desired final form and then removed as a semi-cured state to be cured in another means, such as autoclave. It should also be understood that the mandrel 24 will need time to cool before treating another hose. The ports (not shown) on the mandrel can allow for cool liquid to flow through and lower the temperature of the mandrel 24 for another production cycle.

In an alternative production method using elements shown in FIG. 3, a hose 101 is formed with an internal end stop 150 to limit the insertion of a fitting into the hose 101. The hose 101 is produced using a mandrel 124 and an outer mold 138 in a manner substantially similar to the production of the hose 1 using the mandrel 24 and mold 38. However, in addition to an annular groove 127 to form an annular inner sealing rib 132 with a tip 133 diameter on an inner surface 117 of an inner layer 116, the mandrel 124 has a secondary annular groove 129 to form an annular end stop 150 with a tip diameter 151 on the inner surface 117 of the inner layer 116. The illustrated outer mold 138 has axially spaced circumferential grooves 140 on an inner surface 139 thereof to form clamp guides 143 on an outer surface 114' of an outer layer 114 of the hose 101. The hose 101 may also have an intermediate reinforcing layer 112, substantially similar to the immediate layer 12 of the hose 1.

An end 119 of the tubular hose body 110, as formed in this manner, is fitted on the mandrel 124 and is deformed into a shape following a contour of an outer surface 126 of mandrel 124. Simultaneously, a portion 121 of the tubular hose body 110 corresponding to the first groove 127 and the second groove 129 of the mandrel 124 is deformed into a shape following the grooves 127 and 129, thereby forming the annular sealing rib 132 from groove 127 and a stop 150 from groove 129. The material flows into the grooves 127 and 129 without loss of material or folding of material, so that the outer layer remains straight but for the clamp guides 143, and the inner layer remains straight but for the sealing rib 132. The annular rib tip 133 has an inner diameter less than the inner surface 117 of the inner layer 16, and the stop 150 has a stop tip 151 that has a diameter less than that of the sealing rib tip 133. The stop 150 runs parallel with the sealing rib 132 and is spaced from the end 119, depending on the fitting to be used with the hose 10. As in the previous embodiment, the tubular hose body 110 of can be fitted onto the mandrel 124 relatively smoothly without encountering significant resistance from a molding portion 125 of the mandrel 124, since an outer diameter of molding portion 125 of the mandrel 124 does not exceed an inner diameter 122 of the inner layer 116 of a straight-walled portion 121 of the hose 110. One of the functions of the mandrel 124 is to prevent sagging of the materials of all three layers 112, 114, and 116 of hose body 110. It should be understood that the mandrel 124 may be implemented in multiple sections to serve the purpose of creating at least one sealing rib 132, as well as, preventing sagging.

As shown in FIG. 3, the outer mold 128 is pressed radially inwardly onto the tubular hose body 110 that is fitted onto the molding portion 125 of the mandrel 124, a portion of the tubular hose body 110 corresponding the straight-walled portion 121 being sandwiched by and between the mandrel 124 and the outer mold 128. This portion of the tubular hose body 110 is deformed into a shape following the grooves 127 and 129 of the mandrel 124 and the groove 140 of the outer mold 128 to form a clamp guide 143, a sealing rib 132, and a stop 150 in the tubular hose body 110.

After being formed to shape, the tubular hose body 110 may be vulcanized, as by heating the mandrel 124 and mold 138 a predetermined time to form the completed hose 101. After that, the outer mold 128 may be opened and removed from the hose 101 and the mandrel 124 removed. The result is a hose 101 of multilayer construction including the intermediate layer 112, the inner layer 116 with the sealing rib 132 and end stop 150, and an outer layer 114 with the clamp guides 143. It should be noted that at an opposite end of the hose 110, this process can be repeated.

Figure 6:
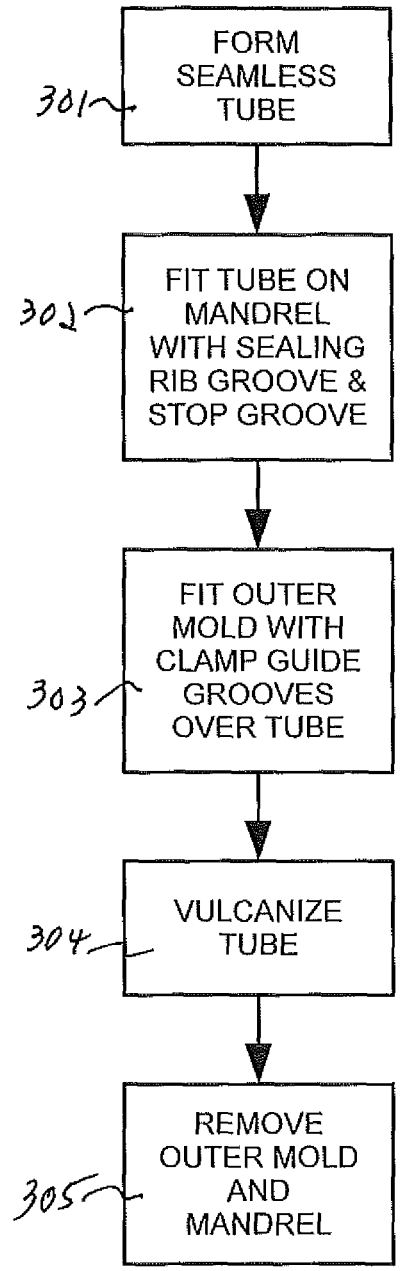
FIG. 6. is a flow diagram showing an alternative method of the present invention for producing a hose with clamp guides

FIG. 5 shows relevant steps of a method for producing the hose 1 as seen in FIG. 2, while FIG. 6 shows the relevant steps of a method for producing the hose 1 in FIG. 3.

In FIG. 5, a method according to the present invention is illustrated for producing a hose 1 with multilayer construction including the intermediate fabric layer 12, the inner layer 16 with the sealing rib 32, and an outer layer 14 with the clamp guides 43. In step 200, an elongated and straight tubular rubber hose body 10 is formed, as by extrusion, and the tubular rubber hose body 10 is cut to a predetermined length to obtain a straight tubular rubber hose body 10 that is not cured or vulcanized (or is only semi-vulcanized). In step 201, the hose body 10 is fitted on a mandrel 10 having the circumferential sealing rib groove 27, such that the tube 10 is deformed into a desired shape. In step 202, an outer mold 38 with a pair of circumferential clamp guide grooves 40 is applied to the hose body 10. In step 203, the tubular rubber hose body 10 is vulcanized while on the mandrel 24 and within the mold 38 by heating for a predetermined time. In step 204, when vulcanization is completed, the hose body 10 may removed from the mold 38 and mandrel 24 and may be washed.

In FIG. 6, a method according to the present invention is illustrated for producing the hose 101 with multilayer construction including the intermediate layer 112, the inner layer 116 with the sealing rib 132 and end stop 150, and the outer layer with the clamp guides 143. In step 301, elongated tubular hose body 110 is formed, as by extrusion, and then cut to a predetermined length to obtain the hose body 110 that is not cured or vulcanized (or is only semi-vulcanized). In step 302, the hose body 110 is fitted onto the mandrel 124 that has the sealing rib groove 127 and the end stop groove 129. In step 303, the outer mold 138 with the clamp guide grooves 140 is applied to the hose body 110. In step 304, the hose body 110 is vulcanized while on the mandrel 124 and within the mold 138 by heating for a predetermined time. In step 305, when vulcanization is completed, the outer mold 138 is opened and the mandrel 124 is removed to provide the finished hose body 110, which may then be washed.

Referring to FIG. 4, the hose 1 may be of a curved shape and may have one or more curved portions 23 or 23' which orient the hose 1 from an axial direction A to an axial direction B of the hose 1. The reference numerals 21 and 21' indicate a pair of straight-walled portions that extends straight from the curved portion in the axial directions A and B of the hose 1. The hose 1 has straight-walled portions 21 and 21' on each axial end 19, 19' thereof.

In the present embodiment shown in FIG. 4, the straight-walled portions 21 and 21' include the clamp guides 43 and 43' projecting radially outwardly with respect to an outer peripheral surfaces 14' of the straight-walled portions 21 and 21' on the outer layer 14 of the hose 1. The clamp guides 43 and 43' create annular ribs or beads about the circumference of the outer layer 14 of the hose 1 to indicate a preferable location for hose clamps 9.

Referring now to FIGS. 4, 7a, and 7b, an exemplary hose connection assembly 60 is shown for use of the hose 1 for connection fittings. The assembly 60 includes the hose 1, a pair of unaligned fittings 61 and 61' and hose clamps 9 and 9', with fitting 61 extending in a direction A and fitting 61' extending in a direction B. In FIG. 4, the clamps 9 and 9' are shown prior to installation.

Figure 9:
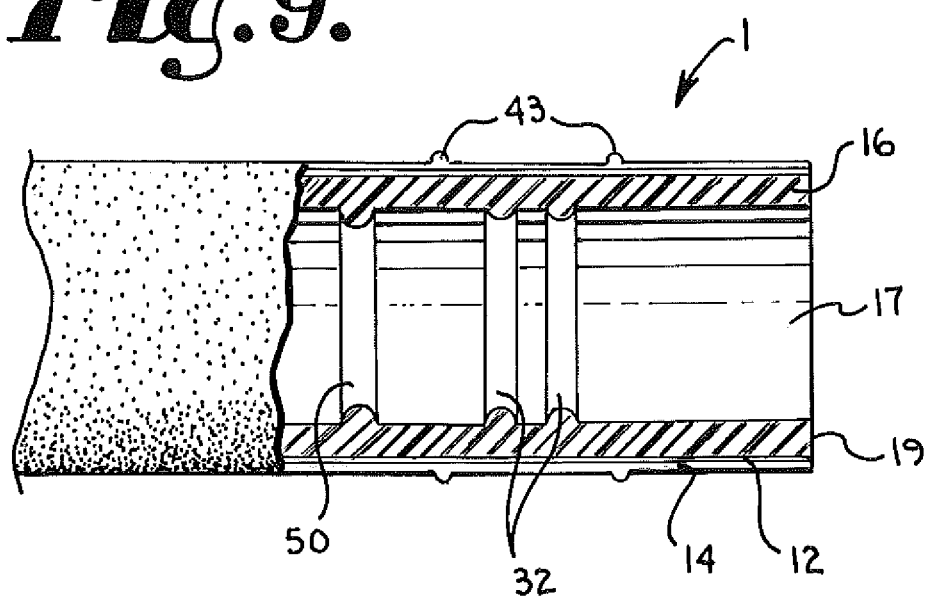
FIG. 9 is an enlarged fragmentary side elevational view of the hose with a portion broken away to illustrate multiple sealing ribs formed on an inner surface of the hose and positioned between a pair of clamp guides.

In the illustrated embodiment, the clamps 9 and 9' each have a cylindrical body 65 and 65' which terminates at one end 66 and 66'. The cylindrical body 65 and 65' of the clamps 9 and 9' begin with an inner diameter 44 and 44' at least slightly greater than the outer diameter of the hose 1. In FIG. 8a, clamp 9 is shown as a worm drive type of clamp. In FIG. 8b, clamp 9' is shown as a spring or tension type of clamp. In FIG. 8c, clamp 9" is shown as an ear and fastener type of clamp. As shown in FIG. 2, the sealing rib 32 is positioned between the clamp guides 43. Thus, the clamp guides 43 indicate an optimum location for the clamp 9 to compressively engage the sealing rib 32 with the surface of the fitting 61 or 61'. As shown in FIG. 9, the hose 1 may include a plurality of sealing ribs 32 which are positioned between the clamp guides 43.

As seen in FIG. 4, an insert portion 63 of the fitting 61 is intended to be inserted into the interior 17A of the hose 1 at end 19, and an insert portion 63' of the fitting 61' is intended to be inserted into the interior of the hose 1 at end 19'. In the illustrated embodiment, an outer surface 67 of the insert portion 63 has at least one circumferential groove 69, which is positioned to mate with a radially inwardly protruding sealing rib 32 on the inner surface of the inner layer 16 of the hose 1.

After the hose 1 is positioned over the insert portion 63 of the fitting 61, the clamp 9 is positioned between the clamp guides 43 such that, as the clamp 9 is circumferentially tensioned, the hose 1 is compressed into sealing engagement with the insert portion 63 directly over the sealing rib 32. The clamp guides 43 indicate the optimum location for the clamp 9, as shown in FIG. 7a. As the hose 1 is crimped, the sealing rib 32 becomes firmly anchored onto the outer surface 65 of the insert portion 63 of the fitting 61. The formation of a fluid-tight seal between the hose 1 and fitting 61 is not only is facilitated by the illustrated groove 69 of the insert portion 63 of the nipple 61 and its relation to the inner sealing rib 32 of the hose 1, but also by the crimping of the clamp 9.

In reference to FIG. 7b, the fitting 61' extends in the direction B. The fitting 61' has an insert portion 63' which can be inserted into the interior of the hose 1 at the end 19'. When the insert portion 63' has been inserted a sufficient depth, it engages an end stop 50 (FIG. 3). It is foreseen, that at this point a sealing rib may engage a groove similar to the groove 69. In this position, a clamp 9' is positioned between clamp guides 43' and is circumferentially crimped so as to radially inwardly compress the hose 1 into sealing engagement of the insert portion 63'. The clamp guides 43' indicate the optimum location of the clamp 9'.

The hose connection assembly 60 is particularly adapted for coupling with fittings of radiator equipment in automotive applications, such as diesel trucks. The illustrated service fitting connections 61 and 61' includes portions 63 and 63' having an industry standard contour.

It is to be understood that while certain forms of the present invention have been illustrated and described herein, it is not to be limited to the specific forms or arrangement of parts described and shown.

What is claimed and desired to be secured by Letters Patent is as follows:

1. A hose and pipe structure comprising:
    (a) an elongated tubular hose member having an outer surface, an inner surface, and a tubular axis; the hose member having opposite ends;
    (b) a pipe member with first and second ends and a circumferential groove on an outer surface of the pipe in spaced relationship to both the first and second ends of the pipe;
    (c) the hose member including a radially outwardly projecting circumferential clamp guide to position a clamp on the hose member and formed on the outer surface of the hose member in axially spaced relation to an end of the hose member; and
    (d) an inwardly projecting circumferential sealing rib formed on an inner surface of the hose member and positioned in axially inward relation to the clamp; during use the rib being positioned directly beneath the clamp and within the groove so as to be located between the groove and the clamp; the rib being sized and shaped to be received in the groove in the pipe so as to be adapted to seal about the pipe when pressure is applied to the rib by the clamp applying pressure axially directly from above the rib.

2. A hose structure as set forth in claim 1 wherein the clamp guide is a first clamp guide and including:
    (a) a second clamp guide substantially similar to the first clamp guide and formed on the outer surface of the hose member in axially spaced relation to the first clamp guide.

3. A hose structure as set forth in claim 1 and including:
    (a) a plurality of axially spaced, inwardly projecting, circumferential, sealing ribs formed on the inner surface of the hose member in axially spaced relation to the clamp guide.

4. A hose structure as set forth in claim 1 and including:
    (a) an inwardly projecting stop structure formed on the inner surface of the hose member in axially spaced relation to the clamp guide.

5. A hose structure as set forth in claim 1 wherein:
    (a) the hose member is formed with more than one layer of material.

6. A hose structure as set forth in claim 1 wherein:
    (a) the hose member is formed with a reinforcing layer.

7. A hose structure as set forth in claim 1 wherein:
    (a) the hose member is formed of a flexible material.

8. A hose structure as set forth in claim 1 wherein:
    (a) the hose member is formed of a flexible elastomeric material.

9. A hose, pipe, and clamp structure comprising:
(a) a pipe and an elongated flexible tubular hose member having an outer surface, an inner surface, and a tubular axis; the hose member having opposite ends; the pipe having an outer surface and first and second ends; the pipe being received in the hose along the tubular axis and having an outer circumferential groove thereon spaced from both the first and second ends of the pipe;
(b) a pair of radially outwardly projecting circumferential clamp guides formed on the outer surface of the hose member in axially spaced relation to one another and to an end of the hose member;
(c) a clamp received between the clamp guides; the hose member having an inwardly projecting circumferential sealing rib formed on the inner surface of the hose member in axially spaced relation to the clamp and being located directly beneath the clamp; the sealing rib being received in the groove of the pipe during use and aligned such that the clamp is positioned radially directly above the sealing rib, so as to seal the sealing rib about the groove when the clamp is tightened against the sealing rib whereby the rib is received in the groove and seals therewith due to pressure applied by the clamp.

10. A hose structure as set forth in claim 9 and including:
(a) wherein the sealing rib is a first sealing rib and including a second rib formed on the inner surface of the hose member and axially positioned relative to the clamp and received in a second groove of the pipe.

11. A hose structure as set forth in claim 9 wherein:
(a) the hose member is formed with more than one layer of material.

12. A hose structure as set forth in claim 9 wherein:
(a) the hose member is formed with a reinforcing layer.

13. A high pressure diesel engine hose in combination with a pipe; the hose comprising:
(a) an elastomeric tubular inner layer with an inner surface, opposite ends and a tubular axis;
(b) an intermediate reinforcement layer positioned in surrounding relation about the inner layer;
(c) an elastomeric outer layer with an outer surface positioned in surrounding relation about the reinforcement layer;
(d) a hose clamp;
(e) a radially outwardly projecting and circumferentially extending clamp guide formed on the outer surface of the outer layer and operably positioning the clamp on the hose due to positioning of the clamp adjacent to the clamp guide;
(f) a radially inwardly projecting and circumferentially extending sealing rib on the interior of the inner layer and extending radially inward from the inner layer; and
(g) the pipe has first and second ends and a circumferential groove on the outside of the pipe spaced from both the first and second ends; the rib being received during use in the groove; the clamp being located directly above the rib and groove so that the rib seals with the groove when the clamp is positioned adjacent the clamp guide and tightened against the rib in the groove.

14. The hose according to claim 13, wherein the outer layer is molded simultaneously with the clamp guide.

15. The hose according to claim 13, wherein the clamp guide is a first clamp guide and including a second clamp guide axially spaced from the first clamp guide.

16. The hose according to claim 15, further comprising an axially inwardly extending circumferential sealing rib molded on the inner layer inner surface.

17. The hose according to claim 16, wherein the rib is located between the first and second clamp guides.

18. The hose according to claim 16, further comprising a stop projecting inward and longitudinally spaced on the inner surface and in a parallel relationship with respect to the sealing rib, the stop having a diameter that is larger than both a diameter of the rib and a diameter of the inner surface.

19. The hose according to claim 13, wherein the intermediate layer is formed of seamless braids of synthetic textile fibers.

20. The hose according to claim 13, wherein the intermediate layer is formed of a braided fabric.

21. The hose according to claim 13, wherein the outer layer is formed of a rubber material.

* * * * *